US006688287B2

(12) United States Patent
Machida

(10) Patent No.: US 6,688,287 B2
(45) Date of Patent: Feb. 10, 2004

(54) CONTROL APPARATUS OF INTERNAL COMBUSTION ENGINE AND CONTROL METHOD THEREOF

(75) Inventor: Kenichi Machida, Atsugi (JP)

(73) Assignee: Unisia Jecs Corporation, Atsugi (JP)

( * ) Notice: Subject to any disclaimer, the term of this patent is extended or adjusted under 35 U.S.C. 154(b) by 131 days.

(21) Appl. No.: 10/097,251

(22) Filed: Mar. 15, 2002

(65) Prior Publication Data

US 2002/0162535 A1 Nov. 7, 2002

(30) Foreign Application Priority Data

Mar. 19, 2001 (JP) ........................... 2001-077526

(51) Int. Cl.$^7$ ............................. F01L 1/34; F02D 41/34; F02P 5/15
(52) U.S. Cl. ..................... 123/406.65; 123/90.15; 123/406.12; 123/480; 123/486; 123/568.14
(58) Field of Search ................. 123/90.11, 90.12, 123/90.14, 90.15, 406.12, 406.45, 406.47, 406.48, 406.49, 406.52, 406.59, 406.64, 406.65, 478, 480, 486, 488, 494, 568.14, 568.21

(56) References Cited

U.S. PATENT DOCUMENTS 6,328,007 B1 * 12/2001 Hirasawa et al. ......... 123/90.15

FOREIGN PATENT DOCUMENTS

JP 59-206624 11/1984
JP 10-068306 3/1998

* cited by examiner

Primary Examiner—Tony M. Argenbright
(74) Attorney, Agent, or Firm—Foley & Lardner

(57) ABSTRACT

In an internal combustion engine provided with a variable valve operating apparatus which variably changes a valve operating characteristic of at least one of intake and exhaust valves, a reference intake pipe pressure and a reference fresh air ratio corresponding to a reference operating condition of the variable valve operating apparatus are computed based on the detection value of the engine operating condition, a fresh air ratio correction amount corresponding to an operating condition of the variable valve operating apparatus is computed based on the detection value of the intake pipe pressure and the reference intake pipe pressure, the reference fresh air ratio is corrected based on the computed fresh air ratio correction amount to compute a final fresh air ratio, and an operating amount of the control object in the internal combustion engine is computed based on the final fresh air ratio to operate the control object.

20 Claims, 4 Drawing Sheets

CONTROL APPARATUS OF INTERNAL COMBUSTION ENGINE AND CONTROL METHOD THEREOF

FIELD OF THE INVENTION

The present invention relates to a technology for controlling, based on a fresh air ratio, an internal combustion engine equipped with a variable valve operating apparatus which variably changes valve characteristics of intake and exhaust valves, such as, valve timing, a valve lift, an operating angle and the like.

RELATED ART OF THE INVENTION

There has been known an electronically controlled fuel injection apparatus called as a D-jetro type which determines a basic fuel injection quantity based on an engine intake pipe negative pressure and an engine rotation speed (see Japanese Unexamined Patent Publication 59-206624).

Further, there has been known a variable valve operating apparatus which variably changes valve characteristics of intake and exhaust valves, such as valve timing, a valve lift, an operating angle and the like. In a variable valve operating apparatus disclosed in Japanese Unexamined Patent Publication No. 10-068306, valve timing is controlled to be advanced/retarded by adjusting a phase of a camshaft relative to a crankshaft.

In the electronically controlled fuel injection apparatus of the above D-jetro type, the intake pipe pressure (boost pressure) is detected as a pressure obtained by putting a fresh air component pressure and a cylinder residual gas pressure together. In a case where an engine is equipped with a variable valve operating apparatus, since the valve characteristics of the intake and exhaust valves are changed so that the cylinder residual gas pressure is changed, even in the same intake pipe pressure, a fresh air component pressure out of the intake pipe pressure becomes indistinct depending on an operating condition of the variable valve operating apparatus. As a result, it becomes impossible to inject a fuel injection quantity corresponding to a real fresh air component pressure (fresh air ratio), causing a problem of deviation of an air-fuel ratio from a target value.

In order to solve the above problem, the present invention has an object to enable of obtaining, with high accuracy while suppressing an increase of data amount, a correction amount for correcting a fresh air ratio that determines operating amounts of an engine, in accordance with an operating condition of a variable valve operating apparatus.

SUMMARY OF THE INVENTION

In order to achieve the above object, the present invention is constituted so that, in an internal combustion engine equipped with a variable valve operating apparatus which variably changes valve operating characteristics of at least one of intake and exhaust valves, a control object is controlled as follows.

An intake pipe pressure of the internal combustion engine is detected by an intake pipe pressure detector, and an operating condition of the internal combustion engine is detected by an operating condition detector.

At a computing unit including a microprocessor and the like, a reference intake pipe pressure, and a reference fresh air ratio corresponding to a reference operating condition of the variable valve operating apparatus are computed based on the detection value of the engine operating condition, a fresh air ratio correction amount corresponding to an operating condition of the variable valve operating apparatus is computed based on the detection value of the intake pipe pressure and the reference intake pipe pressure, the reference fresh air ratio is corrected based on the computed fresh air ratio correction amount to compute a final fresh air ratio, and an operating amount of the control object in the internal combustion engine is computed based on the final fresh air ratio.

An operating device constituted of a fuel injection valve, an ignition plug, and driving circuits thereof operates the control objects, such as a fuel injection quantity, ignition timing and the like, by the operating amounts.

According to such a constitution, a reference operating condition of the variable valve operating apparatus, namely, the reference fresh air ratio in a case of assuming that valve characteristics, such as valve timing, a valve lift, an operating angle and the like are fixed, is corrected with the fresh air ratio correction amount computed corresponding to valve characteristics different from those in the reference operating condition of the variable valve operating apparatus, so that the fresh air ratio can be obtained corresponding to a change in a cylinder residual gas pressure due to the operating condition of the variable valve operating apparatus.

The fresh air ratio correction amount can be obtained with a few data amount using two parameters, the detection value of the intake pipe pressure and the reference intake pipe pressure. Thus, it is possible to improve accuracy of the fresh air ratio to be finally computed, and as a result, the fuel injection quantity, the ignition timing and the like can be controlled with high accuracy.

The other object and features of this invention will become understood from the following description with accompanying drawings.

PREFERRED EMBODIMENTS

An embodiment according to the present invention will be explained with reference to drawings.

Figure 1:
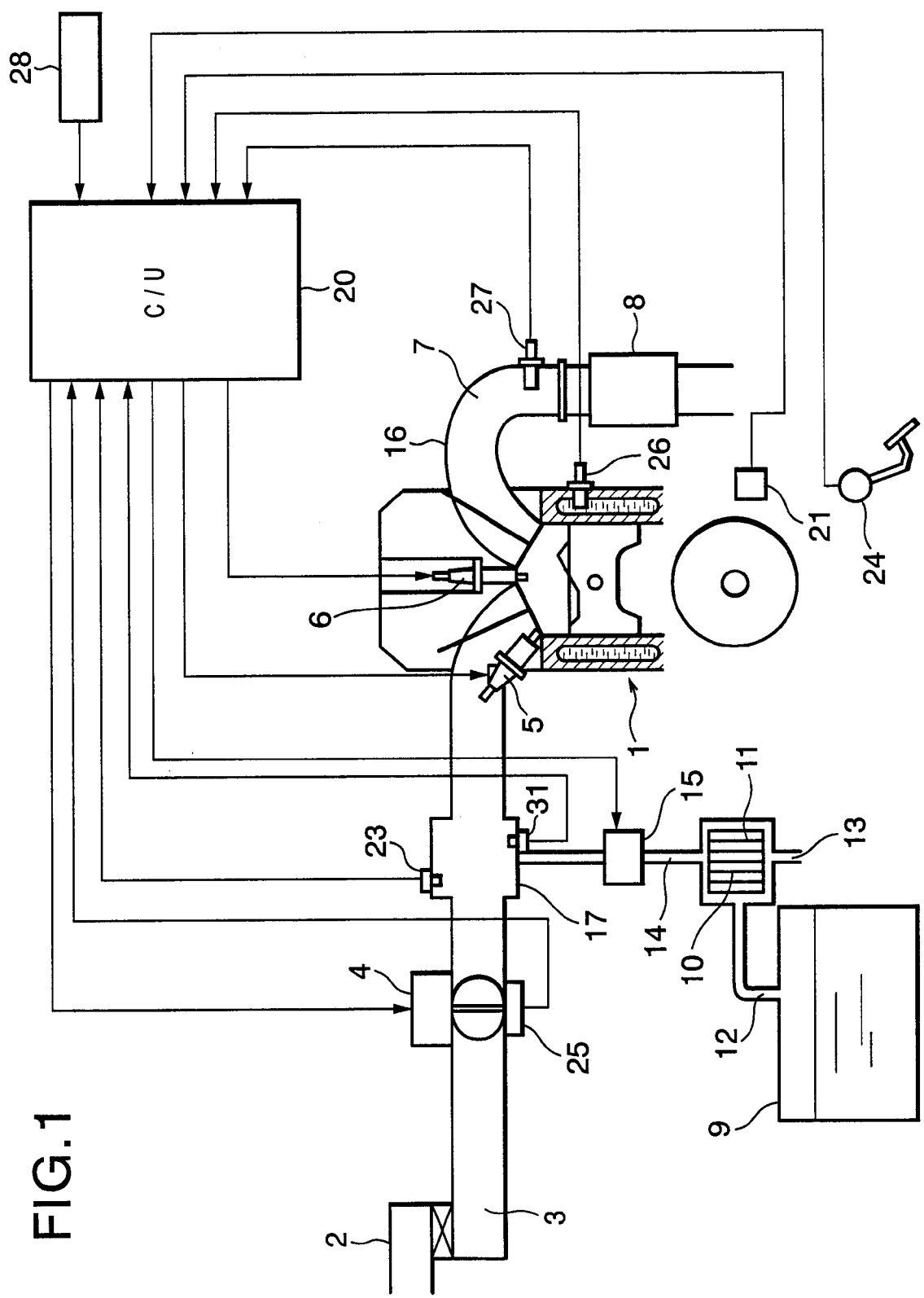
FIG. 1 is a diagram showing a system structure of an internal combustion engine in an embodiment.

In FIG. 1, air is drawn into a combustion chamber of each cylinder in an internal combustion engine 1 mounted on a vehicle via an air cleaner 2, an intake passage 3, and an electronic controlled throttle valve 4 driven to open or close by a motor.

The combustion chamber of each cylinder is equipped with an electromagnetic type fuel injection valve 5 for directly injecting fuel (gasoline) into the combustion chamber. Air-fuel mixture is formed in the combustion chamber by the fuel injected from fuel injection valve 5 and the intake air.

Fuel injection valve 5 is opened with power supply to a solenoid thereof by an injection pulse signal output from a control unit 20, to inject fuel adjusted at a predetermined pressure. The fuel injected from fuel injection valve 5, during intake stroke injection, is diffused into the combustion chamber to form homogeneous air-fuel mixture, and during compression stroke injection, forms stratified air-fuel mixture which concentrates around an ignition plug 6. The air-fuel mixture formed in the combustion chamber is ignited to burn by ignition plug 6.

Note, internal combustion engine 1 is not limited to the direct injection type gasoline engine as mentioned above but may also be an engine in which fuel is injected into an intake port.

Exhaust gas from engine 1 is discharged from an exhaust passage 7. A catalytic converter 8 for exhaust purification is disposed in exhaust passage 7.

There is provided a fuel vapor treatment device that performs a burning treatment of fuel vapor generated in a fuel tank 9.

A canister 10 is a closed container filled with an adsorbent 11 such as active carbon, and is connected with a fuel vapor inlet pipe 12 extending from fuel tank 9. Accordingly, the fuel vapor generated in fuel tank 9 is led via fuel vapor inlet pipe 12 to canister 10, and is adsorbed and collected therein.

Moreover, a fresh air inlet 13 is formed in canister 10 and purge piping 14 leads out from canister 10. A purge control valve 15 to be open/close controlled by means of control signals from control unit 20, is disposed in purge piping 14.

With the above construction, when purge control valve 15 is controlled to open, as a result that an intake negative pressure of engine 1 acts on canister 10, fuel vapor that has been adsorbed in adsorbent 11 of canister 10 is purged by air introduced from fresh air inlet 13. Purged air passes through purge piping 14 and is drawn to the downstream of throttle valve 4 of intake passage 3, and then burned in the combustion chamber of engine 1.

A variable valve operating apparatus 40 is disposed to an intake side camshaft 41. Variable valve operating apparatus 40 is to change valve timing of an intake valve while keeping an operating angle thereof constant, by changing a phase of camshaft 41 relative to a crankshaft. When variable valve operating apparatus 40 is operated, the valve timing of intake valve is advanced from the most retarded position at a non-operating time, to increase a valve overlap amount equal to a period in which an opening period of an exhaust valve overlaps with an opening period of the intake valve.

As variable valve operating apparatus 40, there is used a vane type variable valve operating apparatus.

Figure 2:
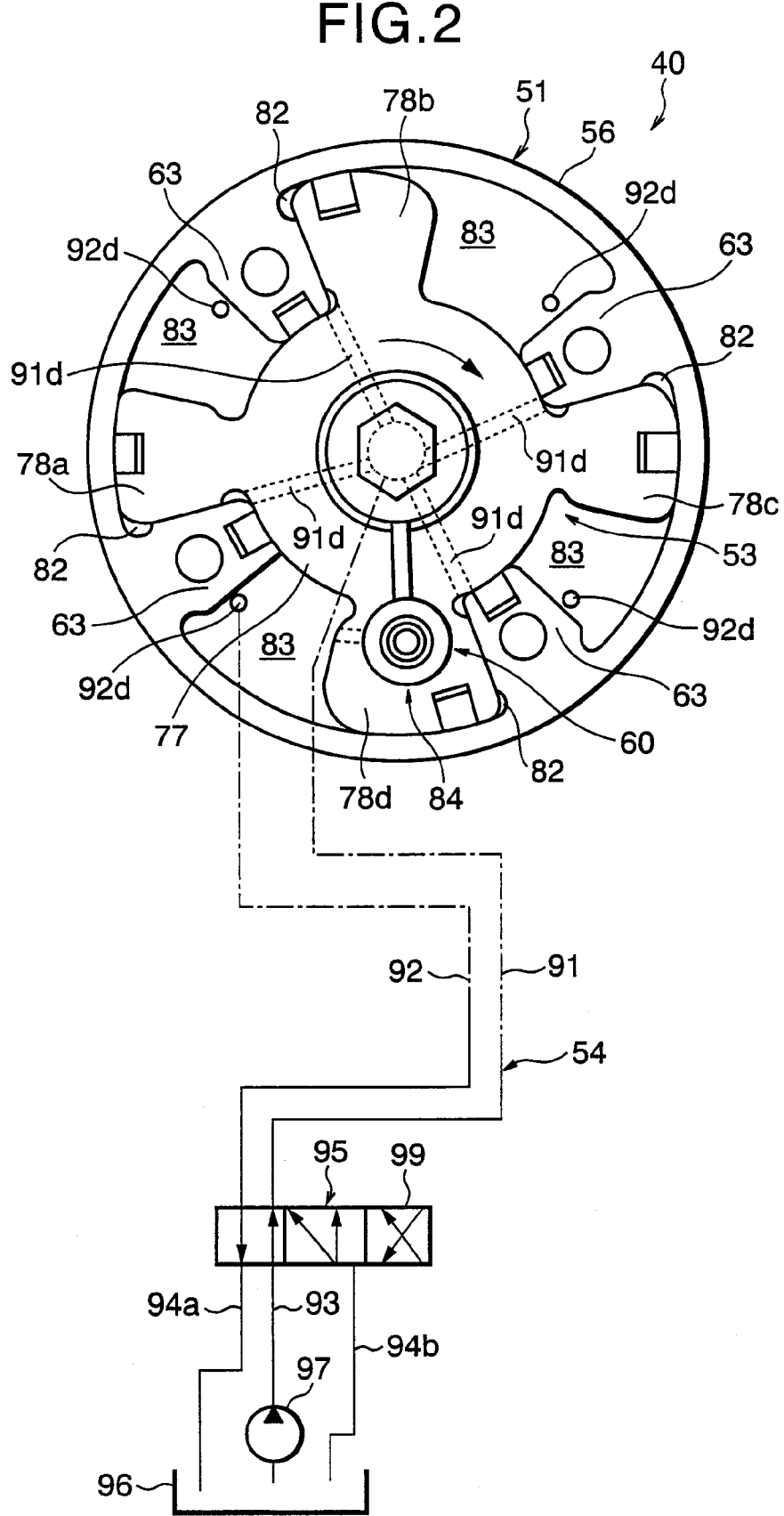
FIG. 2 is a cross section showing a vane type variable valve operating apparatus in the embodiment.

As shown in FIG. 2, the vane type variable valve operating apparatus comprises: a cam sprocket 51 (timing sprocket) which is rotatably driven by the crankshaft (not shown in the figure) via a timing chain; a rotation member 53 secured to an end portion of camshaft 41 and rotatably housed inside cam sprocket 51; a hydraulic circuit 54 that relatively rotates rotation member 53 with respect to cam sprocket 51; and a lock mechanism 60 that selectively locks a relative rotation position between cam sprocket 51 and rotation member 53 at predetermined positions.

Cam sprocket 51 comprises: a rotation portion (not shown in the figure) having on an outer periphery thereof, teeth for engaging with timing chain (or timing belt); a housing 56 located forward of the rotation portion, for rotatably housing rotation member 53; and a front cover and a rear cover (not shown in the figure) for closing the front and rear openings of housing 56.

Housing 56 presents a cylindrical shape formed with both front and rear ends open and with four partition portions 63 protrudingly provided at positions on the inner peripheral face at 90° in the circumferential direction, four partition portions 63 presenting a trapezoidal shape in transverse section and being respectively provided along the axial direction of housing 56.

Rotation member 53 is secured to the front end portion of camshaft 41 and comprises an annular base portion 77 having four vanes 78a, 78b, 78c, and 78d provided on an outer peripheral face of base portion 77 at 90° in the circumferential direction.

First through fourth vanes 78a to 78d present respective cross-sections of approximate trapezoidal shapes. The vanes are disposed in recess portions between each partition portion 63 so as to form spaces in the recess portions to the front and rear in the rotation direction. Advance angle side hydraulic chambers 82 and retarded angle side hydraulic chambers 83 are thus formed between the opposite sides of vanes 78a to 78d and the opposite side faces of respective partition portions 63.

Lock mechanism 60 has a construction such that a lock pin 84 is inserted into an engagement hole (not shown in the figure) at a rotation position (in the reference operating condition) on the maximum retarded angle side of rotation member 53.

Hydraulic circuit 54 has a dual system oil pressure passage, namely a first oil pressure passage 91 for supplying and discharging oil pressure with respect to advance angle side hydraulic chambers 82, and a second oil pressure passage 92 for supplying and discharging oil pressure with respect to retarded angle side hydraulic chambers 83. To these two oil pressure passages 91 and 92 are connected a supply passage 93 and drain passages 94a and 94b, respectively, via an electromagnetic switching valve 95 for switching the passages. An engine driven oil pump 97 for pumping oil in an oil pan 96 is provided in supply passage 93, and the downstream ends of drain passages 94a and 94b are communicated with oil pan 96.

First oil pressure passage 91 is formed substantially radially in base 77 of rotation member 53, and connected to four branching paths 91d communicating with each advance angle side hydraulic chamber 82. Second oil pressure passage 92 is connected to four oil galleries 92d opening to each retarded angle side hydraulic chamber 83.

With electromagnetic switching valve 95, an internal spool valve is arranged so as to control relative switching between respective oil pressure passages 91 and 92, and supply passage 93 and drain passages 94a and 94b.

Control unit 20 controls the power supply quantity for an electromagnetic actuator 99 that drives electromagnetic switching valve 95, based on a duty control signal superimposed with a dither signal.

For example, when a control signal of duty ratio 0% (OFF signal) is output to electromagnetic actuator 99, the hydraulic fluid pumped from oil pump 47 is supplied to retarded angle side hydraulic chambers 83 via second oil pressure passage 92, and the hydraulic fluid in advance angle side hydraulic chambers 82 is discharged into oil pan 96 from drain passage 94a via first oil pressure passage 91.

Consequently, an inner pressure of retarded angle side hydraulic chambers 83 becomes a high pressure while an inner pressure of advance angle side hydraulic chambers 82 becomes a low pressure, and rotation member 53 is rotated to the most retarded angle side by means of vanes 78a to 78d. The result of this is that the opening timing of the intake valve is delayed, and the overlap thereof with the exhaust valve is thus reduced.

On the other hand, when a control signal of a duty ratio 100% (ON signal) is output to electromagnetic actuator 99, the hydraulic fluid is supplied to inside of advance angle side hydraulic chambers 82 via first oil pressure passage 91, and the hydraulic fluid in retarded angle side hydraulic chambers 83 is discharged to oil pan 96 via second oil pressure passage 92, and drain passage 94b, so that retarded angle side hydraulic chambers 83 become a low pressure.

Therefore, rotation member 53 is rotated to the full to the advance angle side by means of vanes 78a to 78d. Due to this, the opening timing of the intake valve is accelerated (advanced) and the overlap thereof with the exhaust valve is thus increased.

Moreover, control unit 20 sets by proportional, integral and derivative (PID) control action, a feedback correction component PIDDTY for making a detection value of rotation phase (advance angle amount) of cam sprocket 51 and the camshaft coincide with a target value (target advance angle amount) set corresponding to the operating condition. Control unit 20 then makes the result of adding a predetermined base duty ratio BASEDTY (neutral control value) to the feedback correction component PIDDTY a final duty ratio VTCDTY, and outputs the control signal for the duty ratio VTCDTY to electromagnetic actuator 99.

In the case where it is necessary to change the rotation phase in the retarded angle direction, the duty ratio is reduced by means of the feedback correction component PIDDTY, so that the hydraulic fluid pumped from oil pump 97 is supplied to retarded angle side hydraulic chambers 83, and at the same time the hydraulic fluid in advance angle side hydraulic chambers 82 is discharged into oil pan 96. Conversely, in the case where it is necessary to change the rotation phase in the advance angle direction, the duty ratio is increased by means of the feedback correction component PIDDTY, so that the hydraulic fluid is supplied into advance angle side hydraulic chambers 82, and at the same time the hydraulic fluid in retarded angle side hydraulic chambers 83 is discharged to oil pan 96. Furthermore, in the case where the rotation phase is maintained in the current condition, the absolute value of the feedback correction component PIDDTY is reduced so that the duty ratio is controlled so as to return to a duty ratio close to the base duty ratio.

However, variable valve operating apparatus 40 is not limited to the above vane type variable valve operating apparatus, but there may be adopted a different type of a variable valve operating apparatus to variably change valve timing. Also, there may be adopted a variable valve operating apparatus for variably changing valve lift and/or an operating angle with or without changing valve timing. Moreover, variable valve operating apparatus 40 may be constructed to variably change valve timing and/or valve lift and/or operating angle of the exhaust valve in place of or as well as the intake valve.

Control unit 20 is equipped with a microcomputer including a CPU, a ROM, a RAM, an A/D converter, an input/output interface and so forth. Control unit 20 receives input signals from various sensors to perform computations based on these signals, thereby controlling operations of fuel injection valve 5, ignition plug 6, purge control valve 15, variable valve operating apparatus 40 and the like.

The various sensors include a crank angle sensor 21 for detecting a crank angle of engine 1 and a cam sensor 22 for taking a cylinder discrimination signal out of the camshaft. The rotation speed NRPM of engine is computed based on a signal from crank angle sensor 21.

In addition, there is provided a boost sensor 23 for detecting an intake negative pressure (intake pipe pressure) of engine 1 in an intake collector portion 17, an intake air temperature sensor 31 for detecting an intake air temperature, an acceleration sensor 24 for detecting an accelerator pedal depression amount APS (accelerator opening), a throttle sensor 25 for detecting an opening degree TVO of throttle valve 4, a water temperature sensor 26 for detecting a cooling water temperature Tw of engine 1, an air-fuel ratio sensor 27 for detecting an air-fuel ratio of a combustion mixture corresponding to an oxygen concentration of exhaust, and a vehicle speed sensor 28 for detecting a vehicle speed VSP.

Control unit 20 computes a fuel injection quantity corresponding to a fresh air amount based on the engine rotation speed NRPM computed based on an intake negative pressure PBE (intake pipe pressure) detected by boost sensor 23 and a signal from crank angle sensor 21, and controls fuel injection valve 5 corresponding to the fuel injection quantity.

Figure 3:
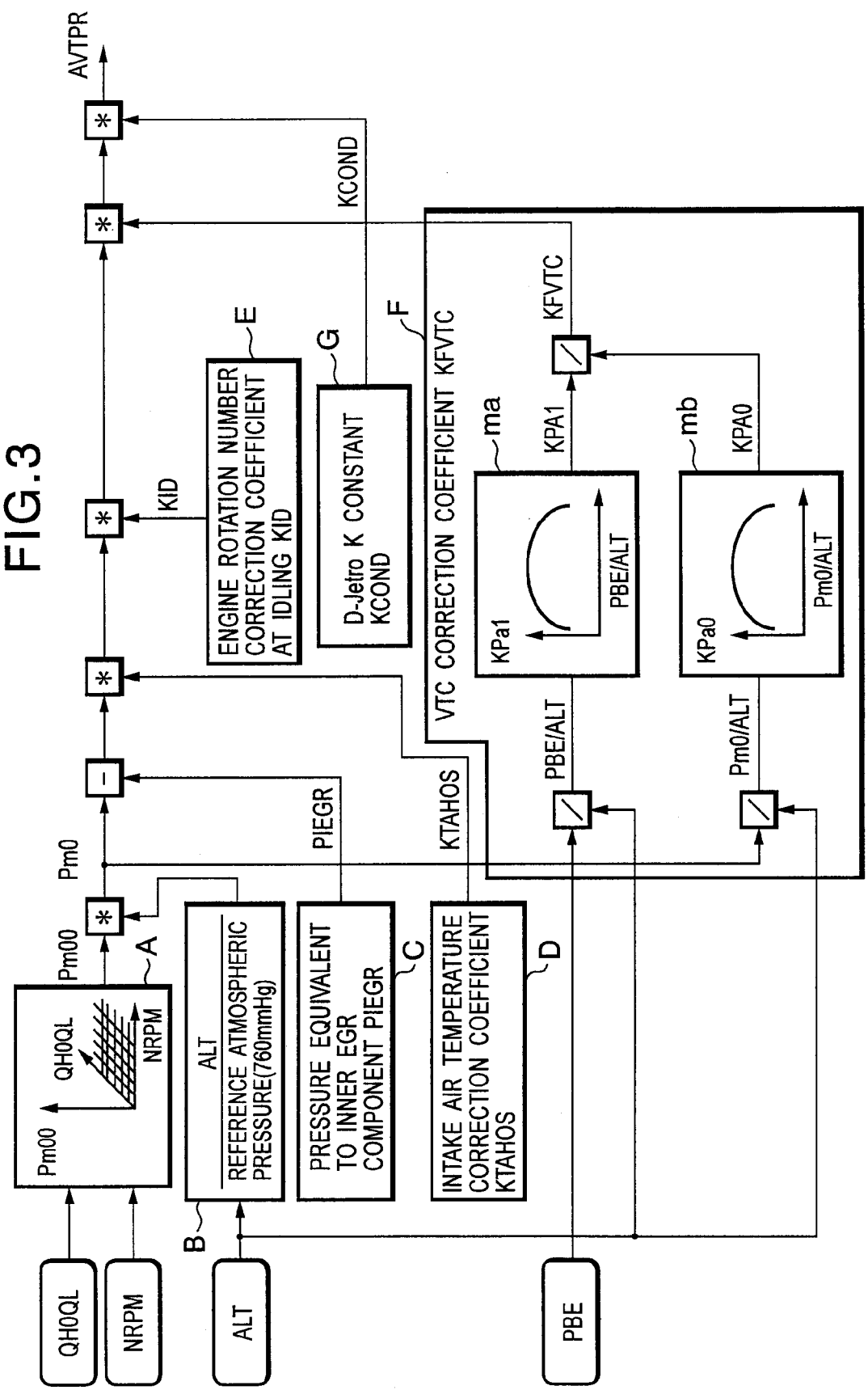
FIG. 3 is a block diagram showing a fuel injection amount computing process in the embodiment.

A specific computation of the fuel injection quantity will be explained for each computation block shown in FIG. 3 as follows.

In a reference intake pipe pressure computing section A, a reference intake pipe pressure Pm00 in a reference condition (at the most retarded position of the intake valve in an initial non-operating condition) of the variable valve operating apparatus (VTC) is retrieved from a map, based on an intake volume flow amount QH0QL computed from a throttle valve opening, and an engine rotation speed NRPM.

An atmospheric pressure correction coefficient computing section B is input with an intake pipe pressure detected in an engine operating stop condition and the like by boost sensor 23 as an atmospheric pressure detection value ATL, and computes an atmospheric pressure correction coefficient by dividing the atmospheric pressure detection value ALT by a reference atmospheric pressure ALT0 (760 mmHg). Although a detailed computation is omitted, if an outside temperature=an intake air temperature in intake pipe in D-jetro system, a changing ratio of the intake pipe pressure due to the atmospheric pressure change is equal to a changing ratio of the atmospheric pressure without being influenced by a temperature change, so that the atmospheric pressure correction coefficient can be computed by the above computation.

The reference intake pipe pressure Pm00 is multiplied with the atmospheric pressure correction coefficient (=ATL/ATL0), to be corrected to the reference intake pipe pressure Pm0.

In an inner EGR component-equivalent pressure computing section C, an inner EGR component-equivalent pressure PIEGR in a reference condition of the VTC is computed by multiplying an inner EGR amount (residual gas) ratio (=1−fresh air ratio) and an exhaust pressure (more accurately, by adding an atmospheric pressure correction), based on the intake volume flow amount QH0QL and the engine rotation speed NRPM.

By subtracting the inner EGR component-equivalent pressure PIEGR from the reference intake pipe pressure Pm0, a pressure PIAIR0 (=Pm0−PIEGR) equivalent to a fresh air in the VTC reference condition is computed.

In an intake air temperature correction coefficient computing section D, an actual inner cylinder intake air temperature is estimated by adding a receiving heat temperature from a wall temperature estimatedly computed in accordance with the engine operating condition to the intake air temperature in the intake pipe detected by intake air temperature sensor 31, and on the other hand, a reference inner cylinder intake air temperature TCYL is estimated corresponding to a reference intake air temperature (for example, 25° C.) in the intake pipe is estimated, and a value obtained by dividing the reference inner cylinder intake air temperature TCYL by the actual inner cylinder intake air temperature TTCYL (preferably by adding an averaging process), is computed as an intake air temperature correction coefficient KTAHOS.

The pressure PIAIR0 (=Pm0−PIEGR) equivalent to the fresh air is multiplied with the intake air temperature correction coefficient KTAHOS and further a correction coefficient KID corresponding to the engine rotation speed at idling computed in an engine rotation speed correction coefficient at idling computing unit, to be corrected, so that a fresh air ratio at the VTC reference condition is computed.

The fresh air ratio at the VTC reference condition as computed above is corrected by a VTC correction coefficient KFVTC corresponding to the operating condition of the VTC according to the invention. The computation of the VTC correction coefficient KFVTC will be explained as follows.

There is determined a fuel injection quantity required for maintaining an air-fuel ratio to be constant even if the valve overlap amount of the intake valve and the exhaust valve is changed. A mass flow amount Q[kg/s] of flow passing through a certain cross section of a pipe (intake pipe) is represented by the following equation based on an equation of one dimensional steady flow of compressive fluid.

$$Q = S \cdot \rho \cdot v \quad S: \text{cross section area}, \ p: \text{density}, \ v: \text{fluid velocity}$$

If an air amount: Qa0 and a fuel amount: Gf0 at the VTC reference condition (the most retarded position) of the valve overlap amount, and the air amount: Qa1 and the fuel amount: Gf1 at the VTC operating condition thereof, $$A/F(\text{air-fuel ratio}) = Qa0/Gf0 = Qa1/Gf1 = \text{constant } (14.7)$$
$$= Sa0 \cdot \rho a0 \cdot va0 / Gf0$$
$$= Sa1 \cdot \rho a1 \cdot va1 / Gf1.$$

If the correction coefficient at the VTC operating condition to the fuel amount at the VTC reference condition is KFVC, $$KFVTC = Gf1/Gf0$$
$$= Sa1 \cdot \rho a1 \cdot va1 / Sa \cdot \rho a0 \cdot va0$$
$$= \rho a1 \cdot va1 / \rho a0 \cdot va0.$$

If pipe opening areas (throttle opening areas) are the same (Sa0=Sa1), when the valve overlap amount is changed, $$KFVTC = [(Pm1/P0)^{1/ka} \cdot \{1-(Pm1/P0)^{(ka-1)/ka}\}^{1/2}] / [(Pm0/P0)^{1/ka} \cdot \{1-(Pm0/P0)^{(ka-1)/ka}\}^{1/2}],$$

wherein P0: atmospheric pressure, Pm0: intake pipe pressure (absolute pressure) at the VTC reference condition, Pm1: intake pipe pressure (absolute pressure) at the VTC operating condition, and ka: ratio of specific heat capacities of air (=1.4).

Accordingly, the fuel amount required when the valve overlap amount is changed, becomes Gf1=Gf0·KFVTC.

In the equation represented by a fraction of the above KFVTC, the denominator KPA0 is represented as a function of f(Pm/P0), and the numerator KPA1 is represented as a function of f(Pm1/P0).

Data of the denominator KPA is set in a map with Pm0/P0 as a parameter and also data of the numerator KPA1 is set in a map with Pm1/P0 as a parameter.

Returning to FIG. 3, in a VTC correction coefficient computing section F, the data of the numerator KPA1 is retrieved from the map "ma" with a value PBE/ALT obtained by dividing the intake air pressure in intake pipe detection value PBE by the atmospheric pressure detection value ALT as a parameter, and the data of the denominator KPA0 is retrieved from the map "mb" with a value Pm0/ALT obtained by dividing the reference intake pipe pressure Pm0 by the atmospheric pressure detection value ALT as a parameter. The VTC correction coefficient KFVTC is computed by dividing the data of the retrieved numerator data of KPA1 by the data of the denominator KPA0. Simply, the denominator and the numerator can be retrieved with the intake air pressure in intake pipe detection value PBE and the reference intake pipe pressure Pm0, assuming the atmospheric pressure is constant (=760 mmHg).

The fresh air ratio at the VTC operating condition is computed by multiplying the VTC correction coefficient KFVTC to the fresh air ratio at the VTC reference condition, and then, the computed result is multiplied with a D-jetro coefficient KCOND computed in a D-jetro coefficient computing section G, so that the fuel injection quantity AVTPR is finally computed.

In summary, the fuel injection quantity AVTPR is computed by the following equation.

$$AVTPR = (Pm0-PIEGR) \cdot KTAHOS \cdot KID \cdot KFVTC \cdot KCOND$$

In such a way, by correcting the reference fresh air ratio at the reference condition of the VTC non-operating time with the VTC correction coefficient KFVTC depending on the VTC operating condition, the fresh air ratio can be obtained with high accuracy corresponding to the change in the inner EGR amount due to the VTC operating condition, and the fuel injection quantity can be computed with high accuracy corresponding to the thus obtained fresh air ratio.

The VTC correction coefficient KFVTC can be accurately computed by a relatively little data using two parameters obtained by dividing the detection value of the intake pipe pressure and the reference intake pipe pressure, by the atmospheric pressure, respectively.

Figure 4:
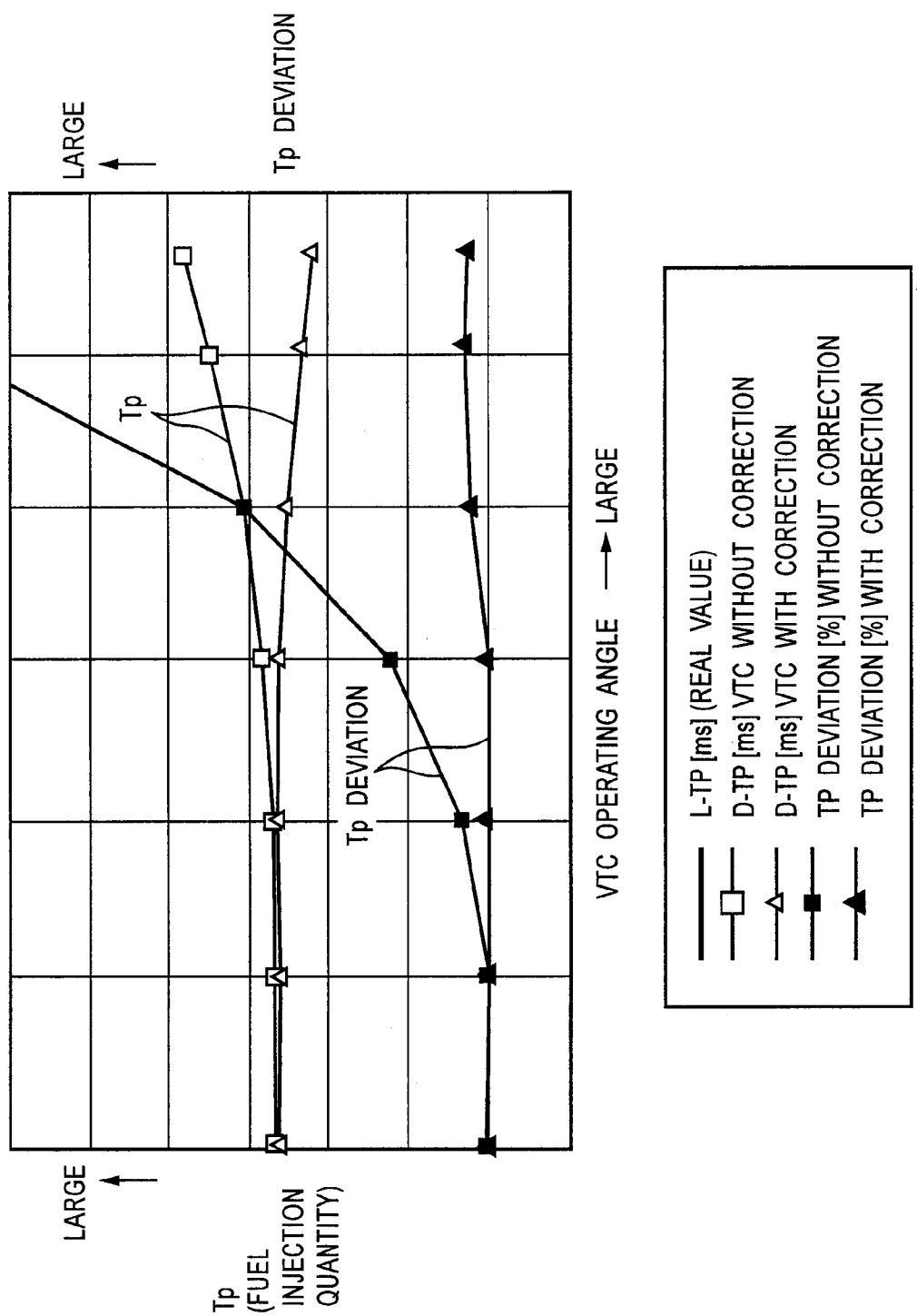
FIG. 4 is a graph showing an effect of the embodiment.

FIG. 4 shows a deviation ratio between a fuel injection quantity corrected by the VTC correction coefficient KFVTC and a correctly set fuel injection quantity.

The present invention can be applied to a control of ignition timing and the like other than the fuel injection quantity as the operating amount controlled corresponding to the fresh air ratio.

The entire contents of basic Japanese Patent Application No. 2001-77526 filed Mar. 19, 2001, a priority of which is claimed, are herein incorporated by reference.

What is claimed is:

1. A control apparatus of an internal combustion engine provided with a variable valve operating apparatus which variably changes a valve operating characteristic of at least one of an intake valve and an exhaust valve, comprising:

an intake pipe pressure detector that detects an intake pipe pressure of said internal combustion engine;

an operating condition detector that detects an operating condition of said internal combustion engine;

a computing unit that computes a reference intake pipe pressure and a reference fresh air ratio corresponding to a reference operating condition of said variable valve operating apparatus based on the detection value of the operating condition of said internal combustion engine, computes a fresh air ratio correction amount corresponding to an operating condition of said variable valve operating apparatus based on the detection value of said intake pipe pressure and said reference intake pipe pressure, corrects said reference fresh air ratio based on said fresh air ratio correction amount to compute a final fresh air ratio, and computes an operating amount of a control object in said internal combustion engine based on said final fresh air ratio; and an operating device that operates said control object in said internal combustion engine by said operating amount.

2. A control apparatus of an internal combustion engine according to claim 1, further comprising an atmospheric pressure detector, wherein an atmospheric pressure detection value to be detected by said atmospheric pressure detector is used for the computation by said computing unit.

3. A control apparatus of an internal combustion engine according to claim 2, wherein said computing unit computes said fresh air ratio correction amount based on a ratio of sad intake pipe pressure detection value to the detection value of said atmospheric pressure, and a ratio of said reference intake pipe pressure to the detection value of said atmospheric pressure.

4. A control apparatus of an internal combustion engine according to claim 1, wherein said computing unit includes a memory, and stores a map which sets in advance said reference intake pipe pressure corresponding to an engine load and an engine rotation speed, into said memory.

5. A control apparatus of an internal combustion engine according to claim 1, wherein said computing unit computes an inner EGR component-equivalent pressure in accordance with the reference operating condition of said variable valve operating apparatus based on the detection value of the engine operating condition, and computes said reference fresh air ratio based on a pressure obtained by subtracting the inner EGR component-equivalent pressure from said reference intake pipe pressure.

6. A control apparatus of an internal combustion engine according to claim 5, wherein said computing unit estimates an inner cylinder intake air temperature corresponding to the reference operating condition of said variable valve operating apparatus based on the detection value of the engine operating condition, and computes said reference fresh air ratio based on a value obtained by correcting, with said inner cylinder intake air temperature, the pressure obtained by subtracting the inner EGR component-equivalent pressure from said reference intake pipe pressure.

7. A control apparatus of an internal combustion engine according to claim 1, wherein a valve operating characteristic to be variably changed by said variable valve operating apparatus is at least one of valve timing, valve lift or operating angle.

8. A control apparatus of an internal combustion engine according to claim 1, wherein said control object is at least one of a fuel injection quantity or ignition timing.

9. A control apparatus of an internal combustion engine according to claim 2, wherein said atmospheric pressure detector is constituted by said intake air pressure detector, and detects, as an atmospheric pressure, the intake pipe pressure detected by the intake pipe detector at an operation stop of the internal combustion engine.

10. A control apparatus of an internal combustion engine according to claim 1, wherein said internal combustion engine is disposed with a throttle valve, said operating condition detector comprises a detector that detects an opening of said throttle valve and a detector that detects an engine rotation speed, and said computing unit computes said reference intake pipe pressure based on the detection value of said throttle valve opening and the detection value of said engine rotation speed.

11. A control apparatus of an internal combustion engine according to claim 10, further comprising an atmospheric pressure detector that detects an atmospheric pressure, wherein said computing unit corrects said reference intake pipe pressure with the atmospheric pressure detection value to make it a final reference intake pipe pressure.

12. A control apparatus of an internal combustion engine provided with a variable valve operating apparatus which variably changes a valve operating characteristic of at least one of an intake valve and an exhaust valve, comprising:

intake pipe pressure detecting means for detecting an intake pipe pressure of said internal combustion engine;

operating condition detecting means for detecting an operating condition of said internal combustion engine;

reference intake pipe pressure computing means for computing a reference intake pipe pressure corresponding to a reference operating condition of said variable valve operating apparatus based on the detection value of the operating condition of said internal combustion engine;

reference fresh air ratio computing means for computing a reference fresh air ratio corresponding to the reference operating condition of said variable valve operating apparatus based on the detection value of the operating condition of said internal combustion engine;

fresh air ratio correction amount computing means for computing a fresh air ratio correction amount corresponding to an operating condition of said variable valve operating apparatus based on the detection value of said intake pipe pressure and said reference intake pipe pressure;

fresh air ratio computing means for correcting said reference fresh air ratio based on said fresh air ratio correction amount to compute a final fresh air ratio;

operating amount computing means for computing an operating amount of a control object in said internal combustion engine based on said final fresh air ratio; and operating means for operating said control object in said internal combustion engine by said operating amount.

13. A control method of an internal combustion engine provided with a variable valve operating apparatus which variably changes a valve operating characteristic of at least one of an intake valve and an exhaust valve, wherein an intake pipe pressure and an operating condition of said internal combustion engine are detected;

a reference intake pipe pressure and a reference fresh air ratio corresponding to a reference operating condition of said variable valve operating apparatus are computed based on the detection value of the operating condition of said internal combustion engine, a fresh air ratio correction amount corresponding to an operating condition of said variable valve operating apparatus is computed based on the detection value of said intake pipe pressure and said reference intake pipe pressure, said reference fresh air ratio is corrected based on said fresh air ratio correction amount to compute a final fresh air ratio, an operating amount of a control object in said internal combustion engine is computed based on said final fresh air ratio, and said control object in said internal combustion engine is operated by said operating amount.

14. A control method of an internal combustion engine according to claim 13, wherein said fresh air ratio correction amount is computed based on a ratio of sad intake pipe pressure detection value to a detection value of an atmospheric pressure, and a ratio of said reference intake pipe pressure to the detection value of said atmospheric pressure.

15. A control method of an internal combustion engine according to claim 13, wherein said reference intake pipe pressure is retrieved from a map stored in a memory corresponding to an engine load and an engine rotation speed, to be computed.

16. A control method of an internal combustion engine according to claim 13, wherein an inner EGR component-equivalent pressure in accordance with the reference operating condition of said variable valve operating apparatus is computed based on the detection value of the engine operating condition, and said reference fresh air ratio is computed based on a pressure obtained by subtracting the inner EGR component-equivalent pressure from said reference intake pipe pressure.

17. A control method of an internal combustion engine according to claim 16, wherein an inner cylinder intake air temperature corresponding to the reference operating condition of said variable valve operating apparatus is estimated based on the detection value of the engine operating condition, and said reference fresh air ratio is computed based on a value obtained by correcting, with said inner cylinder intake air temperature, the pressure obtained by subtracting the inner EGR component-equivalent pressure from said reference intake pipe pressure.

18. A control method of an internal combustion engine according to claim 13, wherein a valve operating characteristic to be variably changed by said variable valve operating apparatus is at least one of valve timing, valve lift or operating angle.

19. A control method of an internal combustion engine according to claim 13, wherein said reference intake pipe pressure is computed based on an opening detection value of a throttle valve disposed in an intake passage of said internal combustion engine and a detection value of an engine rotation speed.

20. A control method of an internal combustion engine according to claim 19, wherein said reference intake pipe pressure is corrected with an atmospheric pressure detection value to be a final reference intake pipe pressure.

* * * * *